United States Patent [19]

Leonard, Jr.

[11] Patent Number: 4,531,866
[45] Date of Patent: Jul. 30, 1985

[54] CHASER POSITION CONTROL
[75] Inventor: John Leonard, Jr., Fayetteville, Pa.
[73] Assignee: Teledyne Industries, Inc., Los Angeles, Calif.
[21] Appl. No.: 424,611
[22] Filed: Sep. 27, 1982
[51] Int. Cl.³ .............................................. B23G 1/02
[52] U.S. Cl. .................................... 408/158; 10/96 T
[58] Field of Search ................ 10/120, 5 R, 95, 145, 10/96 R, 96 T; 408/147, 148, 150, 153, 158, 163, 172

[56] References Cited

U.S. PATENT DOCUMENTS

| Re. 23,684 | 7/1953 | Benninghoff et al. | 10/96 R |
|---|---|---|---|
| 2,291,744 | 8/1942 | Nell | 10/145 |
| 2,393,600 | 1/1946 | Ecoff | 408/163 |
| 2,583,094 | 1/1952 | Girz | 10/96 T |
| 2,679,057 | 5/1954 | Sawdey | 10/96 T |
| 2,746,066 | 5/1956 | Finn et al. | 10/95 |
| 2,848,726 | 8/1958 | Reimschissel et al. | 408/147 X |
| 3,188,666 | 6/1965 | Brown, Sr. et al. | 10/96 R |
| 3,696,454 | 10/1972 | Youtz et al. | 10/95 |
| 3,812,548 | 5/1974 | Theurkaue | 10/120.5 R |

Primary Examiner—William R. Briggs
Assistant Examiner—Glenn L. Webb
Attorney, Agent, or Firm—LeBlanc, Nolan, Shur & Nies

[57] ABSTRACT

Pipe thread cutting apparatus having combined simplified control means for positively controlling the position of the thread cutting chasers throughout the thread cutting operation.

The control is effective to move the chasers to a desired closed position, to adjust the closed position for sizing, to recede the chasers to produce a tapered thread and thereafter move the chasers to open position upon completion of the threading operation.

4 Claims, 10 Drawing Figures

CHASER POSITION CONTROL

BACKGROUND AND SUMMARY OF THE INVENTION

The present invention relates to pipe thread cutting mechanisms and, more particularly, to mechanisms for controlling the position of the thread cutting members or chasers throughout the thread cutting operation.

Thread cutting die heads including the die heads capable of generating a tapered thread are well known in the art. Typical examples of such die heads are shown in U.S. Pat. Nos. 2,054,028; 2,163,598 and 2,848,726.

Such die heads include chasers mounted on slides for radial movement in a die head. In the use of such die heads it is necessary to position the chasers in their closed position to exact size, to recede the chasers, i.e. move them radially outward as the threading progresses to provide a tapered thread and to move the chasers radially outward further to full open position at the conclusion of a threading operation.

In general, separate control mechanisms have been provided to effect the various functions of sizing, receding, opening and closing. Usually the control apparatus includes cams, slides, levers, control rings or latch rings which must be made to very close tolerances to assure required accuracy. Such components are not only expensive to manufacture, but are subject to wear. Also adjustments in these mechanisms are complex, time consuming and require considerable expertise.

It is, accordingly, the principal purpose and object of the present invention to provide improved combined means for controlling all operative positions of the chasers including initial sizing, receding and opening and closing movements which eliminate the cost and complexity of prior systems.

It is a further object of the present invention to provide improved control means which are subject to reduced wear and thus have an extended service life.

It is also an object of the present invention to provide improved chaser position control means in which adjustments for size or other functions may be made quickly, easily and with precision.

Another object of the invention is to provide a thread cutting machine which is capable of accurate adjustment over a wide range of pipe sizes.

In accordance with another aspect of the present invention, pre-turning and threading of the pipe are accomplished by either of two rotary, receding-chaser die heads, depending on the pipe size being processed. A pre-calibrated, vernier-like system of cooperating keyways provides means for rapidly and accurately repositioning or replacing the holders at definite locations appropriate for each size of pipe being processed. These keyways are located in the back surfaces of the chaser holders and also in the mating faces of dovetailed die head slides to which the holders are attached. All chaser holders carry two tangential type chasers, with each chaser being arranged with independent adjustment and clamping means to permit optimum chaser positioning for each different set of operating circumstances.

The operating motions of the die head slides upon which the chaser holders are mounted originate at the rear of the headstock and are relayed forward to the die head by three parallel rods contained within the bore of the headstock spindle. These rods are connected by a common externally grooved ring which is positioned concentrically and rotates with the spindle and the die head. The grooved ring is engaged with a Y-shaped bell crank which operates as the taper control yoke, the rear portion of which contains an antifriction roller which runs on a sloped bar-type taper control cam.

As the headstock moves forward under the influence of the leadscrew in accordance with conventional practice during the threading operation, the roller in the trailing arm of the taper control yoke gradually descends the forwardly sloped cam, causing the rotating grooved ring with attached rods to move horizontally forward at a rate slightly faster than that of the headstock. This action is relayed by the rods to the head operating ring which, in turn, causes the dovetailed slides with their attached chaser holders to progressively recede at the proper rate. Opening and closing of the die head are accomplished through the same basic mechanism as that employed to recede the chasers, with means for rapid displacement of the taper control yoke.

Apparatus is also provided for positively limiting the closing motion of the die head in either single-cut mode or double-cut, i.e., roughing and finishing mode, through appropriate operation of the same mechanism employed to relay receding, opening and closing motions from their origins to the chaser holders.

DESCRIPTION OF THE PREFERRED EMBODIMENTS

Figure 1:
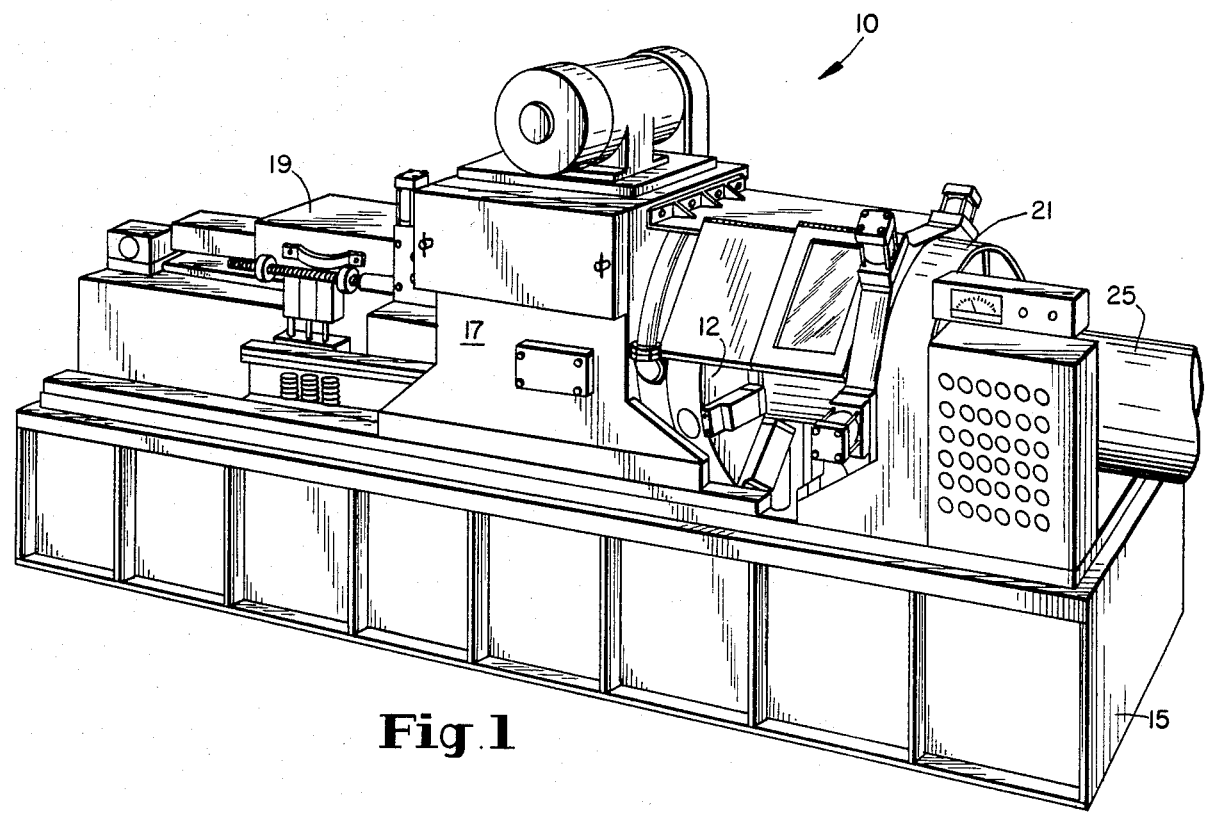
FIG. 1 is a perspective view of the thread cutting apparatus incorporating the present invention.

The thread cutting mechanism 10 employed to illustrate the invention includes a die head 12 intended to be rotated and advanced axially relative to a stationary work piece.

The die head 12 is mounted on a fabricated steel bed 15 and is located adjacent headstock 17 which reciprocates on multiple recirculating antifriction bearings running on hardened and ground ways. A control unit 19 is mounted on the bed 15 on the rearward side of the headstock 17. The control unit 19 contains the leadscrew, taper cam, workstop and headstock reciprocation apparatus as described hereinafter.

A chuck 21 is positioned on the bed 15 forward of the die head 12. The chuck 21 is provided with a central opening for guiding and nominally centering the pipe 25 as it enters the chuck 21, thus positioning the pipe 25 for operation thereon by the die head 12.

It will be apparent to those skilled in the art that many features of the invention are also applicable to other thread cutting mechanisms, whether for external or internal threads and whether the work or the tool is rotated and advanced axially. For example, the present invention could be employed with a thread cutting mechanism having general features as described in commonly assigned U.S. Pat. No. 2,848,726, which is incorporated herein by reference.

Figure 2:
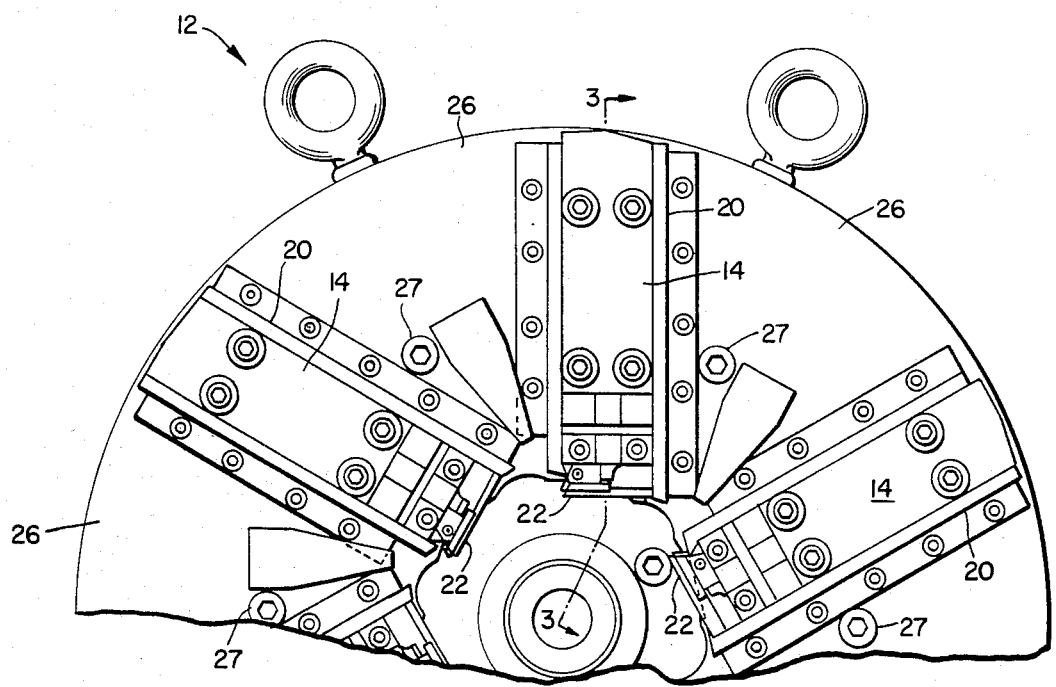
FIG. 2 is a partial front elevation of the die head employed in the apparatus of the present invention.
Figure 3:
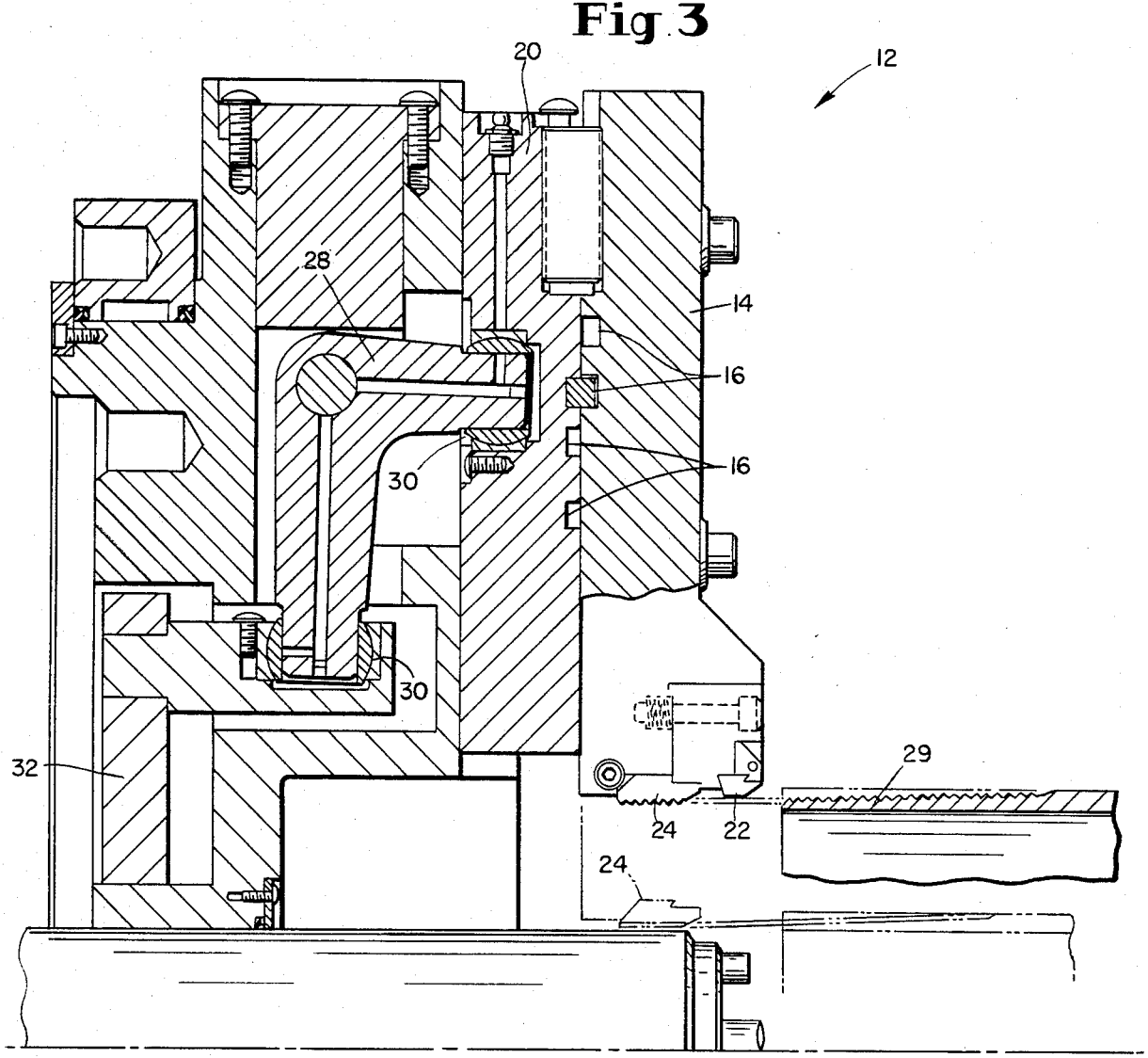
FIG. 3 is an enlarged cross-sectional view taken along line 3—3 of FIG. 2, showing details of a portion of the chaser position control means of the present apparatus.

Referring to FIGS. 2 and 3, the pre-turning and threading of the pipe 25 are accomplished by one of two interchangeable rotary, receding chaser die heads 12, with selection of the particular die head 12 to be employed depending on the size of the pipe being processed. Each head 12 is provided with two sets of interchangeable chaser holders 14 to accommodate a full range of pipe diameters. A pre-calibrated, vernier-like system of cooperating keyways 16 in the back surfaces of the chaser holders 14 and in the mating faces of dovetailed die head slides 20, to which the holders 14 are attached, provides a means for rapidly and accurately repositioning or replacing the holders 14 at finite locations appropriate for each size of pipe to be processed.

In one embodiment, pipe sizes from 4½ inch minimum to 8⅝ inch maximum can be processed by the smaller of the two die heads 12 which utilizes six chaser holders, 14 per set.

Larger sized pipe, having a nominal diameter of from 8⅝ inches to 14 inches, is processed on the larger die head which utilizes eight chaser holders 14 per set.

Each of the chaser holders 14 is provided with a pair of tangential type chasers 22,24 including a pre-turning chaser 22 located immediately adjacent the front face of the holder 14 and a conventional threading chaser 24, located rearwardly of chaser 22, for performing the actual threading operation. Each chaser 22, 24 is provided with independent adjusting and clamping means to permit optimum chaser positioning for each different set of operating circumstances. In one embodiment, chaser 22 is a 41/64 inch×3 inch, high speed steel pre-turning chaser which removed all but 0.020 inch of the excess material per side from the O.D. of the pipe prior to threading, and chaser 24 is a 1½ inch×2¾ inch conventional style chaser. The dashed line position of chaser 24 (FIG. 7C) shows one example of the movement of the chasers between various cutting positions.

The dovetailed slides 20 upon which the chaser holders 14 are mounted are adjustably positioned by gibs 26 secured by screws 27 to the body of the die head 12. These slides 20 operate in exact synchronism under the influence of closely fitted bell cranks 28, each of which is connected via heavy-duty spherical bearings 30 to the slide 20 and to a common head operating ring 32 which is mechanically reciprocated by triple connecting rods 34 passing through the hollow spindle to the head control mechanisms at the rear of the headstock. Each dovetailed slide 20, including its associated bell crank 28, is individually preloaded outward against the head operating mechanism by a system of springs acting between the head body and the slide to preclude backlash.

Figure 4:
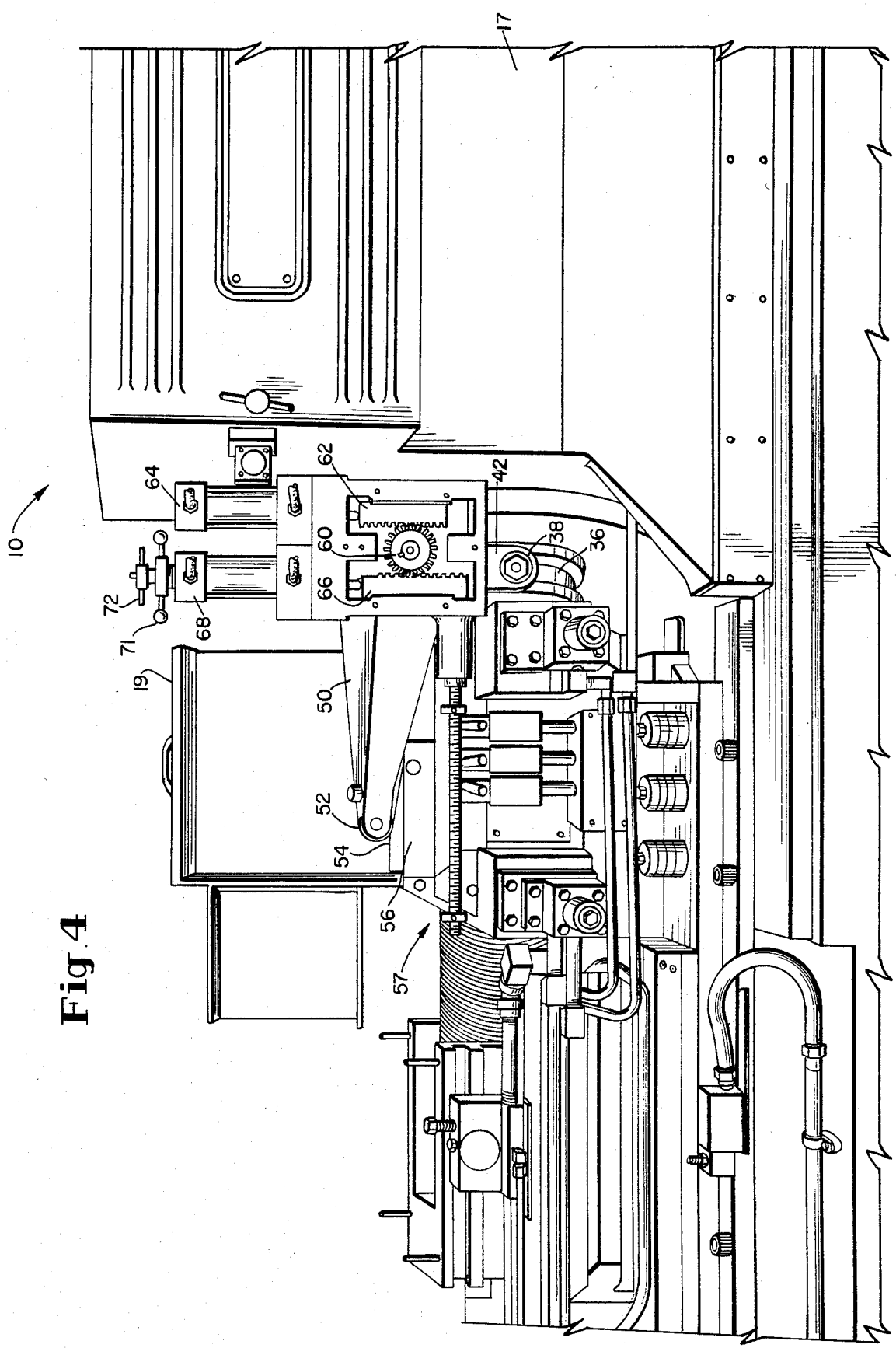
FIG. 4 is a perspective view of a portion of the apparatus of FIG. 1, with various compartments open to show the components of the chaser position control means of the present invention.

With regard to the taper control mechanism, all operating motions of the die head slides 20 upon which the chaser holders 14 are mounted originate at the rear of the headstock and are relayed forward to the die head 12 by three rods 34 contained within the bore of the headstock spindle. For purposes of clarity, only one of the rods 34 is shown in FIG. 7. Upon exiting the rear cap of the spindle, these rods 34 are connected by a common, externally grooved ring 36 positioned concentrically and rotating with the spindle and die head. The grooved ring 36 is engaged at horizontally opposed points by a pair of inwardly facing cam followers 38, 40 contained within the forked arms 42, 44 of a "Y" shaped bellcrank 46 called the taper control yoke which is pivoted about a horizontally-oriented, overhead eccentric shaft 48 supported in brackets affixed to the rear of the headstock. The rearwardly extending stem 50 of the taper control yoke 46, shown in perspective in FIG. 4, contains a straddle-mounted, anti-friction roller 52 which runs on the forwardly sloped, uppermost surface 54 of an adjustable, bar-type taper control cam 56 attached to the leadscrew nut bracket portion of the control unit base 57. As the headstock moves forward under the influence of the leadscrew during the threading operation, the roller 52 contained in the trailing arm 50 of the taper control yoke 46 gradually descends the forwardly sloped cam 56, causing the rotating, grooved ring 36 with its attached rods 34 to move forward at a rate slightly faster than that of the headstock. The rods 34, in turn, relay this differential motion to the head operating ring 32 which, acting through the multiple bell cranks 28 contained within the body of the die head 12, causes the dovetailed slides 20 with their attached chaser holders 14 to progressively recede at the proper rate.

Figure 5:
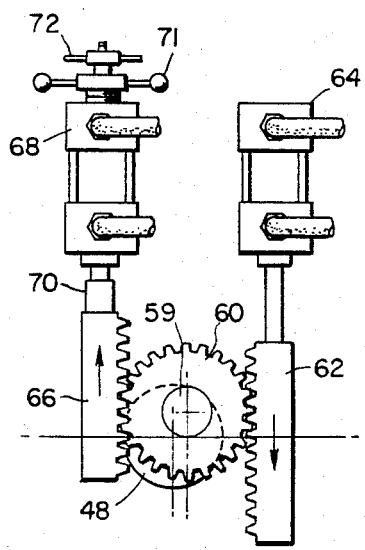
FIG. 5 is a front elevation of another portion of the control means of the present invention.

The opening and closing movements of the die head 12 are accomplished through the same basic mechanism that is used to recede the chasers 22, 24. Whereas the taper control yoke 46 gradually pivots about its mounting shaft 48 in response to the taper cam 56 in order to impart the necessary receding action to the chasers 22, 24 during the threading operation, it is rapidly displaced forward or rearward by an independently functioning device to effect opening and closing of the head 12. This device functions as follows:

That portion of the horizontally-oriented shaft 48 about which the taper control yoke 46 pivots is substantially eccentric in a generally downward direction relative to its mutually concentric ends by which it is rotatably attached to the headstock via journal brackets. One end of the shaft 48 is fitted through connecting shaft 59 with a gear 60 which engages a vertically-reciprocating rack 62 guided within the corresponding journal bracket and operated by an adjustable-stroke hydraulic cylinder 64, as shown in FIG. 5. Upon completion of the threading operation, the hydraulic cylinder 64 rapidly elevates the rack 62, rotating the gear 60 in the appropriate direction to swing the eccentric portion of the shaft 48, and hence the taper control yoke 46, forward to abruptly disengage the chasers 22, 24 from the workpiece threads 29 via the interconnecting members within the spindle and die head 12. The amount that the chasers 22, 24 disengage from the threads 29 can be regulated by adjusting the corresponding stroke of the head operating cylinder 64.

During retraction of the headstock in preparation for a succeeding threading cycle, the chasers 22, 24 gradually converge, following a path parallel to that assumed during threading but in the reverse direction and displaced radially outward by the amount of disengagement occurring at the end of the cut.

Prior to engagement of the leadscrew nuts at the beginning of the next cycle, the die head operating cylinder 64 drives the operating rack 62 downward, oscillating the taper control yoke 46 rearward thus resetting the chasers 22,24 to their fully converged position.

All of the apparatus associated with size adjustment and the automatic two-cut cycle of the die head 12 is consolidated into the journal bracket which contains the die head operating rack and gear arrangement. This apparatus positively limits the closing motion of the die head 12 in either conventional single-cut mode or in double-cut, roughing and finishing mode by acting through the same basic mechanism used to relay receding, opening, and closing motions from their origins to the chaser holders 14.

Die head closing motion is limited by interrupting the rotation of the gear 60 which oscillates the eccentric shaft 48 carrying the taper control yoke 46. This is accomplished through the sizing rack 66 which engages the gear 60 on the side 180° opposite that of the hydraulically driven operating rack 62 and by which it is reciprocated vertically but in opposing directions. Immediately above the sizing rack is hydraulic cylinder 68, the piston rod 70 of which is in direct alignment with the rack 66. The force produced by this cylinder 68 is substantially greater than that of the die head operating cylinder 64 and its working stroke is infinitely adjustable in both directions by means of conveniently located hand knobs 71 and 72. When the machine is programmed to operate in conventional, single-cut mode, this cylinder 68 remains retracted to the extent of adjustable travel permitted by the finishing cut sizing control knob 71. As the die head operating cylinder 64 drives the operating rack 62 downward to close the die head, the sizing rack 66 ascends at a corresponding rate until it strikes the end of the sizing cylinder piston rod 70 to positively establish a precise, closed position of the chaser holders 14.

When operating in double-cut mode, the sizing cylinder 68 extends to the limit of its adjustable stroke to intercept the sizing rack 66 at a point corresponding to the desired rough cut diameter of the threads 25. Since the sizing cylinder 68 exerts a net force substantially greater than that of the opposing die head operating cylinder 64, it functions as a temporary and adjustable, yet positive, stop for the sizing rack 66. Upon completion of the roughing cut, the die head 12 is opened in the manner described above, the sizing cylinder 68 retracts to its adjustable stroke limit, and the finishing cut is then made.

All radial positions of the chasers are controlled either by rotation of the yoke 46 about the axis of shaft 48 or by rotation of the shaft 48 or by a combination of these motions. The various actions are shown in FIGS. 6 and 7A through 7C.

Figure 6:
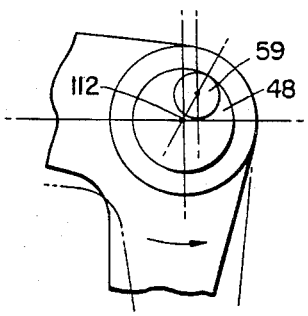
FIG. 6 is an enlarged fragmentary view of one component of the chaser position control.
Figure 7A:
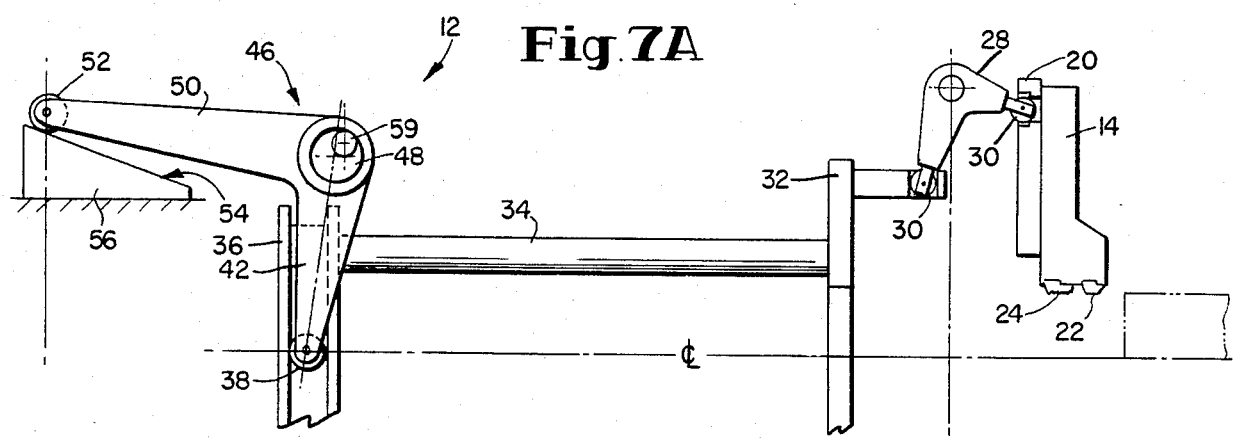
FIGS. 7A–7C are schematic representations of various steps in the sequence of operating the chaser control mechanism of the present invention.

FIG. 7A illustrates the relative positions of the die head operating components prior to threading. The initial radial position of the chasers is determined with the required precision by adjusting the rotated position of the shaft 48 by appropriate actuation of the control knobs 71 and 72 as described above. For example, rotation of the shaft 48 in a clockwise direction as viewed in FIG. 6 will displace the axis 112 of the shaft to the rear producing a slight rotation of the bellcranks 28 in a clockwise direction as viewed in FIGS. 7A-7C to displace the chasers radially inwardly. It is apparent that due to the geometry of the components, rotational movements of the shaft 48 produce very small increments of movement of the chasers thus permitting very precise sizing adjustments.

FIG. 7A illustrates the position of the components after sizing adjustments have been made and just prior to threading. In this position all of the components are in their limit of rearward movement.

Figure 7B:
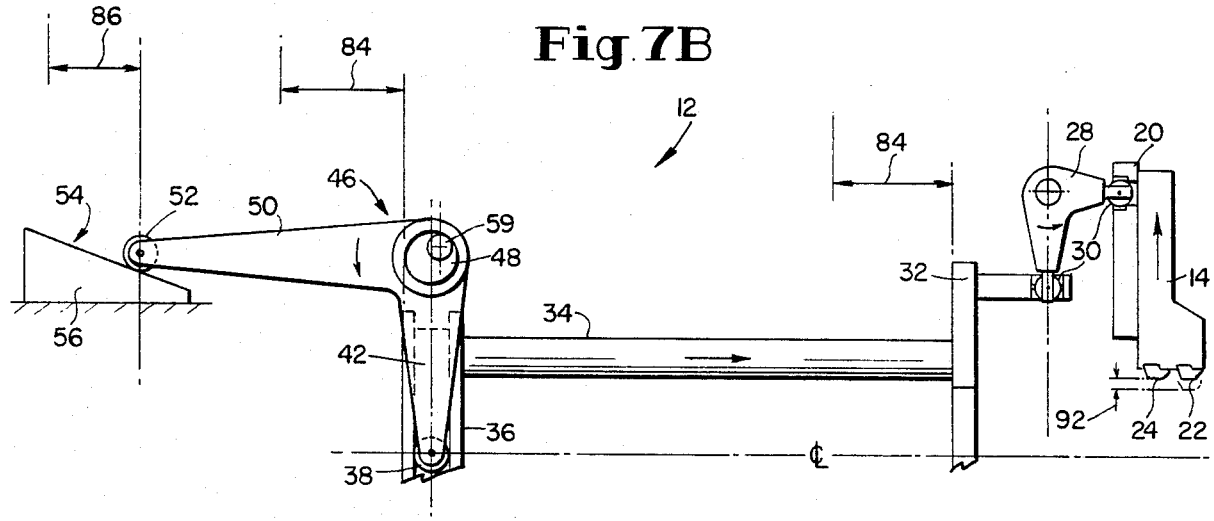

FIG. 7B shows the positions of the components upon completion of threading but prior to opening of the die head. The horizontal forward motion of the rods during the threading operation is indicated at 84 and the smaller horizontal forward motion at the headstock is indicated at 86, the differential motion being due to the rotation of the yoke 46 in a counterclockwise direction about the axis of shaft 48 producing a slight opening movement of the chasers to thereby produce the desired tapered thread. The receding motion of the chaser is indicated at 92.

Figure 7C:
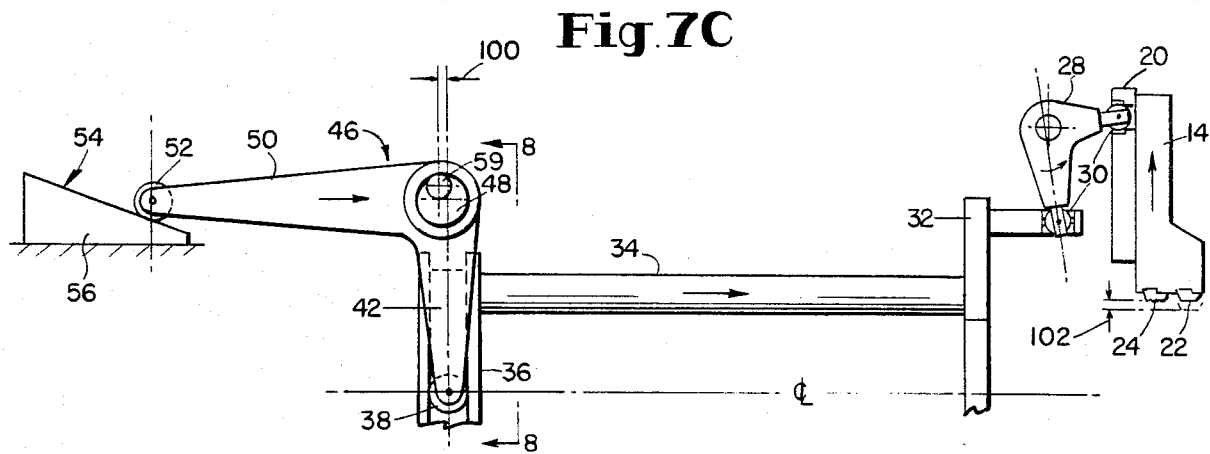
Figure 8:
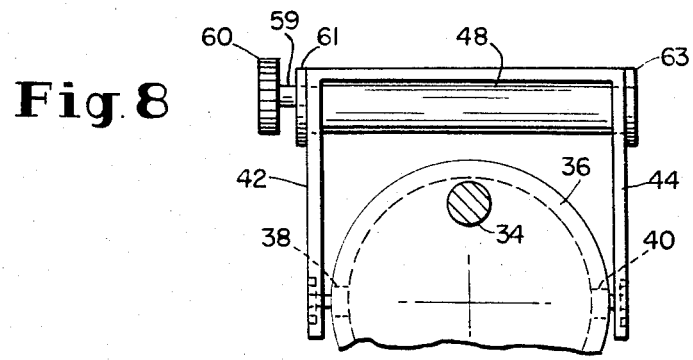
FIG. 8 is a cross-sectional view taken along line 8—8 of FIG. 7C, illustrating further details of construction.

FIG. 7C shows the positions of the control components and the position of the die head at the conclusion of the opening movement which is effected by rotation of the shaft 48 in a counterclockwise direction as viewed in FIGS. 6 and 7C. As a result of the rotation of shaft 48 the yoke 46 is offset forwardly as indicated at 100. This in turn causes a forward movement of the shafts 34 rotating the bellcranks 28 in a counterclockwise direction to move the chasers radially outwardly to open position, this movement being indicated at 102.

To ready the die head for a succeeding operation all components are returned to their initial position shown in FIG. 7A.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In thread cutting apparatus comprising a headstock carrying a die head having a plurality of chaser holders mounted for radial movement therein, means for controlling the radial position of said chaser holders comprising an annular control member mounted on said headstock for movement axially thereof, a plurality of bell cranks carried by said die head, each bell crank being operably connected to said control member and one of said chaser holders and effective to move said chaser holders radially in response to axial movement of said control member, an additional bell crank, means mounting said additional bell crank in said headstock for rocking movement about an axis transverse to the axis of said die head, means responsive to rocking movement of said additional bell crank to displace said annular control member axially and thereby displace said chaser holders radially and means responsive to axial movement of said headstock during threading to rock said additional bell crank and thereby move said chaser holders radially.

2. The combination according to claim 1 together with means for selectively displacing said mounting means for said additional bellcrank to thereby effect sizing adjustments and opening and closing movements of said chaser holders.

3. The combination according to claim 1 wherein said mounting means for said additional bellcrank comprises a shaft rotatably mounted on said headstock, said shaft having eccentric partions for supporting said additional bellcrank, and means for rotating said shaft to displace said bellcrank to effect sizing adjustments and to move said chaser holders between open and closed positions.

4. In thread cutting apparatus comprising a headstock carrying a die head having a plurality of chaser holders mounted for radial movement therein, means for controlling the radial position of said chaser holders comprising a control member mounted on said headstock for movement axially thereof, means connecting said control member with each of said chaser holders and effective to convert axial motion of said control member to radial motion of said chaser holders, a bell crank, means mounting said bell crank in said headstock for rocking movement about an axis transverse to the axis of said die head, said mounting means comprising a shaft rotatably mounted on said headstock, said shaft having eccentric portions for supporting said bell crank, means responsive to rocking movement of said bell crank about said axis to displace said control member axially and thereby displace the chaser holders radially, means for rotating said shaft to displace the axis of said bell crank to effect sizing adjustments and to move said chaser holders between open and closed position, and means responsive to axial movement of said headstock during threading to rock said bell crank to move said chaser holders radially.

* * * * *